United States Patent
Takeuchi

(10) Patent No.: US 9,536,674 B2
(45) Date of Patent: Jan. 3, 2017

(54) ELECTROLYTIC SOLUTION FOR ELECTROLYTIC CAPACITOR, AND ELECTROLYTIC CAPACITOR

(71) Applicant: NIPPON CHEMI-CON CORPORATION, Tokyo (JP)

(72) Inventor: Shingo Takeuchi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 91 days.

(21) Appl. No.: 14/432,157

(22) PCT Filed: Sep. 28, 2013

(86) PCT No.: PCT/JP2013/076442
§ 371 (c)(1),
(2) Date: Mar. 27, 2015

(87) PCT Pub. No.: WO2014/051129
PCT Pub. Date: Apr. 3, 2014

(65) Prior Publication Data
US 2015/0235773 A1    Aug. 20, 2015

(30) Foreign Application Priority Data
Sep. 29, 2012    (JP) ................................. 2012-218915

(51) Int. Cl.
*H01G 9/035*   (2006.01)
*H01G 9/042*   (2006.01)
*H01G 9/02*    (2006.01)

(52) U.S. Cl.
CPC ................ *H01G 9/035* (2013.01); *H01G 9/02* (2013.01); *H01G 9/042* (2013.01)

(58) Field of Classification Search
CPC .......... H01G 9/035; H01G 9/042; H01G 9/02; H01G 9/145
See application file for complete search history.

(56) References Cited

U.S. PATENT DOCUMENTS 6,166,899 A * 12/2000 Tamamitsu ............ H01G 9/022
                                                   252/62.2

FOREIGN PATENT DOCUMENTS

| JP | 2001-223136 A | 8/2001 |
| JP | 2007-273928 A | 10/2007 |
| JP | 2011-204949 | * 10/2011 |
| JP | 2011-204949 A | 10/2011 |

OTHER PUBLICATIONS

Translation for JP 2011-204949, Oct. 2011.*
International Search Report issued in PCT/JP2013/076442, dated Jan. 7, 2014.

* cited by examiner

*Primary Examiner* — Carol M Koslow
(74) *Attorney, Agent, or Firm* — Birch, Stewart, Kolasch & Birch, LLP

(57) ABSTRACT

Provided is an electrolytic solution suitable for use in a 100 WV class electrolytic capacitor having low inductance at low temperatures and high durability in high-temperature use conditions. This electrolytic solution for an electrolytic capacitor contains: a mixed organic solvent including sulfolane and γ-butyrolactone; water; an electrolyte selected from the group consisting of a quaternized pyridinium salt of carboxylic acid and a quaternized imidazolinium salt of carboxylic acid; boric acid; and mannitol; and has a mass ratio of boric acid and mannitol in the range of 1:1.2 to 1:1.6, and a total amount of boric acid and mannitol of 10.0 to 14.5% by mass of the total electrolytic solution, the water content being 1.5 to 2.0% by mass of the total electrolytic solution.

4 Claims, No Drawings

ELECTROLYTIC SOLUTION FOR ELECTROLYTIC CAPACITOR, AND ELECTROLYTIC CAPACITOR

BACKGROUND OF THE INVENTION

1. Field of the Invention

The present invention relates to an electrolytic solution suitable for use in a 100 WV class electrolytic capacitor and to an electrolytic capacitor using this electrolytic solution.

2. Description of the Related Art

An electrolytic capacitor with an electrolytic solution has in a sealed case a structure comprising a positive electrode made of a foil of valve metal such as aluminum, tantalum and niobium with an oxide film as a dielectric on the surface, a negative electrode for current collection (an apparent negative electrode) and a separator holding the electrolytic solution between the positive electrode and the negative electrode, and a wound type or laminating type of electrolytic capacitor is widely used. In the capacitor, the electrolytic solution directly contacts the dielectric and functions as a true negative electrode, and the characteristic of the electrolytic capacitor largely depends on the kind of electrolytic solution.

An electrolytic capacitor used in the automobile industry requires a rating that enables it to function at a low temperature of −40° C. in addition to a voltage resistance of 50 WV or more. It also has to exhibit durability at high temperatures so it can be used within a high-temperature engine compartment etc. Further, it must show little deterioration in electrostatic capacitance and impedance characteristics after usage at 125° C. for a long period and must exhibit no structural weaknesses that can lead to problems such as liquid leakage. The applicant suggested an aluminum electrolytic capacitor that could meet these requirements in Patent Document 1 (JP 2001-223136 A). An electrolytic solution in this capacitor comprises a mixed solvent containing sulfolane, γ-butyrolactone and ethylene glycol, a quaternary imidazolinium salt or a quaternary pyrimidinium salt of carboxylic acid such as phthalic acid, boric acid amounting to 0.5 to 2.5% by mass of the total electrolytic solution, and mannitol amounting to 0.5 to 2.5% by mass of the total electrolytic solution. Especially, if 20 to 60% by mass of the mixed solvent is γ-butyrolactone, the dielectric loss of the capacitor decreases, while the high-temperature life characteristic and low-temperature characteristics improve.

PRIOR ARTS DOCUMENTS

Patent Documents

Patent Document 1: JP 2001-223136 A

BRIEF SUMMARY OF THE INVENTION

1. Problems to be Solved by the Invention

Higher performance is required for these electrolytic capacitors these days. Especially, an electrolytic capacitor for a control circuit of a fuel injection system of an automobile engine requires that an operational capacity of a 100 WV class electrolytic capacitor when used at 125° C. is guaranteed. Therefore, when the inventor considered the feasibility of a 100 WV class capacitor using the electrolytic solution disclosed in Patent Document 1, it was found that the low-temperature impedance characteristic after use at a high temperature for a long period was inadequate.

Therefore, the objective of the present invention is to provide an electrolytic solution that can be suitably used for a 100 WV class electrolytic capacitor with a low impedance at a low temperature and high durability under high-temperature usage and to provide an electrolytic capacitor using this electrolytic solution.

2. Means for Solving Problems

It is known that the deterioration of a low-temperature impedance characteristic of an electrolytic solution after long-term use at a high temperature is caused by ethylene glycol in the mixed solvent. Ethylene glycol is a good solvent for boric acid and mannitol, but it is not good in terms of its behavior on the low-temperature impedance characteristic after a high temperature durability test for a long period. Therefore, it is preferable to remarkably decrease the contained amount of ethylene glycol in the electrolytic solution or not to use ethylene glycol at all.

The inventor undertook a keen examination of an electrolytic solution in which ethylene glycol is not used and found that a sufficient quantity of boric acid and mannitol to secure a voltage resistance can be dissolved in an electrolytic solution having a very small amount of water, and that by using this electrolytic solution, a 100 WV class electrolytic capacitor that has low impedance at low temperature and high durability under high-temperature usage could be obtained.

Therefore, the present invention relates, first, to an electrolytic solution for an electrolytic capacitor comprising: a mixed organic solvent having sulfolane and γ-butyrolactone; water; an electrolyte selected from a group consisting of a quaternary imidazolinium salt of carboxylic acid and a quaternary pyrimidinium salt of carboxylic acid; boric acid; and mannitol, wherein the mass ratio of boric acid and mannitol is in a range of 1:1.2 to 1:1.6, and the total amount of boric acid and mannitol is 10.0 to 14.5% by mass of the total electrolytic solution, and the water content is 1.5 to 2.0% by mass of the total electrolytic solution.

It is preferable that the mass ratio of boric acid and mannitol is in a range of 1:1.2 to 1:1.6 and the total amount of boric acid and mannitol is in a range of 12.5 to 14.5% by mass because an extremely excellent capacitor in terms of low impedance at low temperature and durability under high-temperature usage, which are required characteristics for a 100 WV class capacitor, can be obtained. If the amount of water is less than 1.5% by mass of the total electrolytic solution, the preferable amount of boric acid and mannitol cannot be dissolved in the electrolytic solution. If the mass ratio of boric acid and mannitol is in a range of 1:1.2 to 1:1.6 and the total amount of boric acid and mannitol is 10.0% by mass or more and less than 12.5% by mass, this range of quantity of boric acid and mannitol can be dissolved in the electrolytic solution even if the amount of water is less than 1.5% by mass of the total electrolytic solution, but if the amount of water is less than 1.5% by mass of the total electrolytic solution, a capacitor that satisfies both the requirements of low impedance at low temperature and durability under high-temperature usage, which are required characteristics for a 100 WV class capacitor, cannot be obtained. Also, if the amount of water exceeds 2.0% by mass of the whole electrolytic solution, the voltage resistance will decrease after the electrolytic solution is used at a high temperature for a long period, or the impedance at −40° C. will increase after long-period use at a high temperature.

Also, if the amount of mannitol is less than 1.2 times or more than 1.6 times that of boric acid, mannitol will not be dissolved into a solution containing water which is 1.5 to 2.0% by mass of the total electrolytic solution. Further, if the total amount of boric acid and mannitol is less than 10.0% by mass of the electrolytic solution, the voltage resistance required for a 100 WV class capacitor cannot be obtained. Moreover, if the total amount of boric acid and mannitol exceeds 14.5% mass of the total electrolytic solution, impedance at −40° C. will increase after long-period use at a high temperature.

With the electrolytic solution of the present invention, a 100 WV class electrolytic capacitor that has low impedance at low temperature and high durability under high-temperature usage can be obtained. Therefore, the present invention also provides an electrolytic capacitor comprising: a positive electrode made of valve metal foil with an oxide film on the surface; a negative electrode made of valve metal foil; and a separator holding an electrolytic solution between the positive electrode and the negative electrode; in which, as the electrolytic solution, the electrolytic solution of the present invention is used.

3. Advantageous Effects of the Invention

The electrolytic solution for an electrolytic capacitor of the present invention ensures a capacitor that can function as a 100 WV class capacitor when it is used at a high temperature, has a low specific resistance even at a low temperature, and further provides a capacitor in which deterioration of the voltage resistance and impedance characteristic is small even after long-period use at a high temperature.

DETAILED DESCRIPTION OF THE INVENTION (1) Electrolytic Solution for Electrolytic Capacitor An electrolytic solution for an electrolytic capacitor of the present invention comprises, as essential components, a mixed organic solvent having sulfolane and γ-butyrolactone; water; an electrolyte selected from a group consisting of a quaternary imidazolinium salt of carboxylic acid and a quaternary pyrimidinium salt of carboxylic acid; boric acid; and mannitol.

In the present invention, the mixed organic solvent that contains sulfolane and γ-butyrolactone is used. The ratio of sulfolane and γ-butyrolactone is preferably 20:80 to 5:95 by mass ratio. The electrolytic solution of the present invention may contain a minute amount of other solvents as long as these do not adversely affect this invention, but it is preferable that other solvents are not present in the electrolytic solution. Examples of solvents that can be contained in the solution are monohydric alcohols (ethanol, propanol, butanol, cyclobutanol, cyclopentanol, and benzyl alcohol etc.), polyhydric alcohols and oxy alcohol compounds (propylene glycol, glycerol, methyl cellosolve, ethyl cellosolve, methoxypropylene glycol, and dimethoxypropanol etc.), amides (N-methylfonnamide, N,N-dimethylformamide, N-ethylformamide, N,N-diethylformamide, N-methylacetamide, and N-methyl-2-pyrrolidone etc.), lactones (5-valerolactone and γ-valerolactone etc.), nitriles (acetonitrile etc.), oxides (dimethylsulfoxide etc.), and 2-imidazolidinones (1,3-dimethyl-2-imidazolidinone, 1,3-diethyl-2-imidazolidinone, and 1,3,4-trimethyl-2-imidazolidinone).

The compound selected from a group consisting of a quaternary imidazolinium salt of carboxylic acid or a quaternary pyrimidinium salt of carboxylic acid is used as an electrolyte in the electrolytic solution of the present invention. This compound provides an electrolytic solution with low specific resistance and excellent heat resistance.

As a carboxylate anion that constitutes the quaternary imidazolinium salt or the quaternary pyrimidinium salt, an anion of phthalic acid, isophthalic acid, terephthalic acid, maleic acid, benzoic acid, toluic acid, enanthic acid or malonic acid can be used. Especially, an anion of phthalic acid is preferable because it has excellent thermal stability and suitably inhibits the increase of the specific resistance value of the electrolytic solution.

Examples of a quaternary imidazolinium cation that constitutes the carboxylic salt include 1,3-dimethylimidazolinium cation, 1,2,3-trimethylimidazolinium cation, 1,2,3,4-tetramethylimidazolinium cation, 1-ethyl-3-methylimidazolinium cation, and 1-ethyl-2,3-dimethylimidazolinium cation.

Examples of a quaternary pyrimidinium cation that constitutes the carboxylic salt include 1,3-dimethyl-4,5,6-trihydropyrimidinium cation, 1,2,3-trimethyl-4,5,6-trihydropyrimidinium cation, 1,2,3,4-tetramethyl-5,6-dihydropyrimidinium cation, 1-ethyl-3-methyl-4,5,6-trihydropyrimidinium cation, and 1-ethyl-2,3-dimethyl-4,5,6-trihydropyrimidinium cation.

The compound selected from a group consisting of a quaternary imidazolinium salt of carboxylic acid and a quaternary pyrimidinium salt of carboxylic acid can be a single compound, or a mixture of two or more compounds can be used. The amount of this compound in the electrolytic solution does not have any restriction if the specific resistance value of the electrolytic solution is within the acceptable range, but 8 to 20% by mass of the total electrolytic solution is preferable, and 10 to 15% by mass is especially preferable.

Boric acid and mannitol are used as voltage improvers in the electrolytic solution of the present invention. The boric acid and mannitol form a complex compound, and this complex compound improves the voltage resistance of the electrolytic solution. However, water is produced in the course of the formation of the complex compound. In the present invention, the amount of water in the electrolytic solution that is eventually obtained is adjusted to 1.5 to 2% by mass.

The mass ratio of boric acid and mannitol used is in a range of 1:1.2 to 1:1.6 and the total amount of boric acid and mannitol is 10.0 to 14.5% by mass, and preferably 12.5 to 14.5% by mass, of the total electrolytic solution. If the amount of mannitol is less than 1.2 times or more than 1.6 times that of boric acid, they are not dissolved into the solution containing water of 1.5 to 2.0% by mass of the total electrolytic solution. Further, if the total amount of boric acid and mannitol used is less than 10.0% by mass of the total electrolytic solution, the voltage resistance required for a 100 WV class capacitor cannot be obtained. If the total amount of boric acid and mannitol exceeds 14.5% of the total electrolytic solution, the impedance at −40° C. increases after the capacitor is used at a high temperature for a long period.

It is preferable that the mass ratio of boric acid and mannitol is in a range of 1:1.2 to 1:1.6 and the total amount of boric acid and mannitol is 12.0 to 14.5% by mass because an extremely excellent capacitor is obtained in terms of low impedance at low temperature and durability under high-temperature usage, which are the characteristics required for a 100 WV class capacitor. If the amount of water is less than 1.5% by mass of the total electrolytic solution, boric acid and mannitol in an amount within the preferable range cannot be dissolved into the electrolytic solution. Also, if the amount of water exceeds 2.0% by mass of the total electrolytic solution, impedance at −40° C. increases after the capacitor is used at a high temperature for a long period.

When the mass ratio of boric acid and mannitol is in a range of 1:1.2 to 1:1.6 and the total amount of boric acid and mannitol is 10.0% or more and less than 12.5% by mass, these amounts of boric acid and mannitol can be dissolved if the amount of water is more than approximately 1.0% by mass of the total electrolytic solution and these amounts can be dissolved even if the amount of water is less than 1.5% by mass of the total electrolytic solution. However, when the amount of water is less than 1.5% by mass of the total electrolytic solution, a capacitor that exhibits the two main characteristics required for a 100 WV class capacitor, that is, low impedance at low temperature and durability under high-temperature usage, cannot be obtained. Generally, as it takes a shorter time for a capacitor used at a high temperature to exhibit a decrease in voltage resistance, lower impedance tends to be required at a low temperature of −40° C. Since the time during which a capacitor using an electrolytic solution that contains water of less than 1.5% by mass of the total electrolytic solution as well as boric acid and mannitol in an amount of 10.0 to 12.5% by mass of the total electrolytic solution exhibits the voltage resistance of a 100 WV class capacitor under a high-temperature condition is relatively shorter, this capacitor requires a lower impedance, but the demand for the lower impedance at the low temperature is not satisfied. Also, if an electrolytic solution that contains water of more than 2.0% by mass of the total electrolytic solution as well as boric acid and mannitol in an amount of 10.0% by mass or more and less than 12.5% by mass is used, voltage resistance also decreases after the capacitor is used at a high temperature for a long period.

For the electrolytic solution of the present invention, another additive can be used in an amount that does not hamper the advantageous effect of the invention. Examples of usable additives are an inorganic acid electrolyte such as phosphoric acid, silicic acid or carbonic acid, a nonionic surfactant, colloidal silica or polyoxyethylene glycerol to improve voltage resistance, a nitro compound such as p-nitrophenol and p-nitrobenzoic acid to absorb hydrogen that can generate within the electrolytic capacitor, and a phosphoric ester compound such as methyl phosphate and ethyl phosphate to prevent the hydration deterioration of an electrode foil The electrolytic solution of an electrolytic capacitor of the present invention can be obtained by dissolving in the mixed organic solvent having sulfolane and γ-butyrolactone the compound selected from a quaternary imidazolinium salt of carboxylic acid or a quaternary pyrimidinium salt of carboxylic acid, boric acid, mannitol and, as needed, another additive, while adding heat as needed, and adjusting the amount of water to the aforementioned range by partially removing the water that was contained in the source materials and that was produced when the complex of boric acid and mannitol was formed. Also, the amount of water can be adjusted to the aforementioned range by removing all the water that was contained in the source materials and that was produced when the complex of boric acid and mannitol was formed and newly adding water. The amount of water in the solution can be measured by a Karl Fischer titration method.

(2) Electrolytic Capacitor

An electrolytic capacitor comprises a positive electrode made of valve metal foil with an oxide film on the surface, a negative electrode made of valve metal foil, and a separator holding an electrolytic solution placed between the positive electrode and the negative electrode.

As the positive electrode, valve metal foil such as aluminum foil, tantalum foil, niobium foil, or titanium foil, and preferably aluminum foil, which is surface-enlarged by etching by a chemical or electrochemical method, and further, is given chemical formation by using an aqueous ammonium adipate solution or an aqueous ammonium phosphate solution or the like so that an oxide film is formed on the surface of the valve metal foil, is used. As a negative electrode, valve metal foil such as aluminum foil, tantalum foil, niobium foil or titanium foil, and preferably aluminum foil, which is surface-enlarged by etching by a chemical or electrochemical method, is used. As a separator, Manila paper, Kraft paper, synthetic fiber paper, glass paper, a mixed paper consisting of glass paper and Manila paper or Kraft paper can be used.

After a lead wire is attached to each of the positive electrode and the negative electrode, the positive electrode and the negative electrode are wound or laminated via the separator to prepare a capacitor element. After immersing the electrolytic solution of the present invention into this capacitor element, the element obtained is placed in a bottomed cylindrical exterior case. Further, a sealed body, which is made of elastic rubber such as butyl rubber and which has through holes to lead the lead wire out, is attached to the open end of the exterior case, and by drawing the edge of the exterior case and sealing the exterior case, the electrolytic capacitor is obtained.

EXAMPLES

The examples of the present invention are shown as follows, but the present invention is not limited to the following examples.

(1) Preparation of Electrolytic Solution

Electrolytic solutions with different compositions that contained a mixed organic solvent having sulfolane (SUL) and γ-butyrolactone (GBL), 1-ethyl-2,3-dimethylimidazolinium phthalate (EDMIP), boric acid (BA), mannitol (MAN), water, dibutyl phosphate (DBP) and p-nitrobenzoic acid (NBA) were prepared as shown in Table 1 below. Comparative Examples 1 to 4 are the examples of an electrolytic solution where the water content is either less than 1.5% by mass or more than 2.0% by mass of the total electrolytic solution. Also, Comparative Examples 5 to 8 are the examples of an electrolytic solution where mannitol is less than 1.2 times or more than 1.6 times by mass ratio of boric acid. Comparative Examples 9 and 10 are the examples of an electrolytic solution where the total amount of boric acid and mannitol is less than 10.0% or more than 14.5% by mass of the total electrolytic solution. Comparative Example 11 is an example of an electrolytic solution containing ethylene glycol (EG) (see Patent Document 1).

TABLE 1

| | Composition of electrolytic solutions (% by mass) | | | | | | | | | | |
|---|---|---|---|---|---|---|---|---|---|---|---|
| | SUL | GBL | WATER | EG | EDMIP | BA | MAN | DBP | NBA | MAN/BA | MAN + BA |
| Example 1 | 7.25 | 65.25 | 1.5 | — | 11 | 5.63 | 7.87 | 0.75 | 0.75 | 1.4 | 13.5 |
| Example 2 | 7.22 | 64.98 | 1.8 | — | 11 | 5.63 | 7.87 | 0.75 | 0.75 | 1.4 | 13.5 |
| Example 3 | 7.20 | 64.80 | 2.0 | — | 11 | 5.63 | 7.87 | 0.75 | 0.75 | 1.4 | 13.5 |
| Example 4 | 7.25 | 65.25 | 1.5 | — | 11 | 6.13 | 7.37 | 0.75 | 0.75 | 1.2 | 13.5 |

TABLE 1-continued

| | Composition of electrolytic solutions (% by mass) | | | | | | | | | | |
|---|---|---|---|---|---|---|---|---|---|---|---|
| | SUL | GBL | WATER | EG | EDMIP | BA | MAN | DBP | NBA | MAN/BA | MAN + BA |
| Example 5 | 7.25 | 65.25 | 1.5 | — | 11 | 5.20 | 8.30 | 0.75 | 0.75 | 1.6 | 13.5 |
| Example 6 | 7.15 | 64.35 | 1.5 | — | 11 | 6.04 | 8.46 | 0.75 | 0.75 | 1.4 | 14.5 |
| Example 7 | 7.35 | 66.15 | 1.5 | — | 11 | 5.21 | 7.29 | 0.75 | 0.75 | 1.4 | 12.5 |
| Example 8 | 7.30 | 65.70 | 2.0 | — | 11 | 4.81 | 7.69 | 0.75 | 0.75 | 1.6 | 12.5 |
| Example 9 | 7.40 | 66.60 | 1.5 | — | 11 | 5.45 | 6.55 | 0.75 | 0.75 | 1.2 | 12.0 |
| Example 10 | 7.60 | 68.40 | 1.5 | — | 11 | 4.00 | 6.00 | 0.75 | 0.75 | 1.5 | 10.0 |
| Example 11 | 7.55 | 67.95 | 2.0 | — | 11 | 4.00 | 6.00 | 0.75 | 0.75 | 1.5 | 10.0 |
| Comparative Example 1 | 7.36 | 66.24 | 1.4 | — | 11 | 5.21 | 7.29 | 0.75 | 0.75 | 1.4 | 12.5 |
| Comparative Example 2 | 7.09 | 63.81 | 2.1 | — | 11 | 6.59 | 7.91 | 0.75 | 0.75 | 1.2 | 14.5 |
| Comparative Example 3 | 7.61 | 68.49 | 1.4 | — | 11 | 4.16 | 5.84 | 0.75 | 0.75 | 1.4 | 10.0 |
| Comparative Example 4 | 7.54 | 67.86 | 2.1 | — | 11 | 4.00 | 6.00 | 0.75 | 0.75 | 1.5 | 10.0 |
| Comparative Example 5 | 7.30 | 65.70 | 2.0 | — | 11 | 5.95 | 6.55 | 0.75 | 0.75 | 1.1 | 12.5 |
| Comparative Example 6 | 7.30 | 65.70 | 2.0 | — | 11 | 4.63 | 7.87 | 0.75 | 0.75 | 1.7 | 12.5 |
| Comparative Example 7 | 7.55 | 67.95 | 2.0 | — | 11 | 4.76 | 5.24 | 0.75 | 0.75 | 1.1 | 10.0 |
| Comparative Example 8 | 7.55 | 67.95 | 2.0 | — | 11 | 3.70 | 6.30 | 0.75 | 0.75 | 1.7 | 10.0 |
| Comparative Example 9 | 7.65 | 68.85 | 1.5 | — | 11 | 3.80 | 5.70 | 0.75 | 0.75 | 1.5 | 9.5 |
| Comparative Example 10 | 7.10 | 63.90 | 1.5 | — | 11 | 6.81 | 8.19 | 0.75 | 0.75 | 1.2 | 15.0 |
| Comparative Example 11 | 21.50 | 43.50 | 1.5 | 7.5 | 11 | 5.63 | 7.87 | 0.75 | 0.75 | 1.4 | 13.5 |

MAN/BA: the ratio of MAN against BA (by mass)
MAN + BA: the ratio of the total amount of MAN and BA against the total electrolytic solution (% by mass)

In the electrolytic solution of Comparative Example 1, an insoluble substance consisting of boric acid and mannitol existed even though the total amount of boric acid and mannitol was decreased to 12.5% by mass of the total electrolytic solution. In the electrolytic solutions of Comparative Examples 5 and 6, the insoluble substance still existed even though the total amount of boric acid and mannitol was decreased to 12.5% by mass of the total electrolytic solution and water was increased to 2.0% by mass of the total electrolytic solution. In the electrolytic solutions of Comparative Examples 7 and 8, the insoluble substance still existed even though the total amount of boric acid and mannitol was decreased to 10.0% by mass of the total electrolytic solution and water was increased to 2.0% by mass of the total electrolytic solution. In the electrolytic solutions of Examples 1 to 10 and Comparative Examples 2 to 4 and 9 to 11, there was no insoluble substance. Therefore, it was found that boric acid and mannitol did not dissolve in the electrolytic solution if the mass ratio of boric acid and mannitol was in a range of 1:1.2 to 1:1.6. Also, it was found that, even if the mass ratio of boric acid and mannitol was 1:12 to 1:1.6, water of 1.5% or more by mass of the total electrolytic solution was necessary to dissolve boric acid and mannitol in an amount of 12.5% or more by mass in total.

(2) Preparation of an Electrolytic Capacitor

A capacitor element was composed by winding through a separator a positive electrode foil, where etching treatment was given to aluminum foil to enlarge the effective surface area and a dielectric aluminum oxide film was formed on the surface by anodization, and a negative electrode foil where etching treatment was given to aluminum foil. After immersing to the capacitor element each of the electrolytic solutions of Examples 1 to 11 and Comparative Examples 2 to 4 and 9 to 11, this capacitor element was sealed in the exterior case. For each electrolytic solution, 100 aluminum electrolytic capacitors (rated voltage: 100 V, rated capacitance: 100 μF, diameter: 12.5 mm, length: 20 mm) were manufactured.

(3) Characteristic Evaluation of Electrolytic Capacitors

When impedance at −40° C. of the electrolytic capacitors obtained was evaluated, every capacitor showed a value of 2Ω or less. Then, the short-circuit ratio was evaluated when the voltages of 125 V and 150 V, which were above the rated voltage, were added under the condition of current value 50 A at a high temperature of 125° C. The cases where the short-circuit ratio when the voltage of 125 V or 150 V was added was 2% or more were judged as no-good. The result is summarized in Table 2. When the voltage of 150 V was added, the capacitors of Examples 9 to 11 and Comparative Examples 2 to 4, 9, and 10 showed a short-circuit ratio of more than 2%, but when the voltage of 125 V was added, all the capacitors showed low short-circuit ratio. Therefore, as far as the short-circuit ratio was concerned, all capacitors had a potential to be used as a 100 WV class capacitor.

For each electrolytic capacitor, a high-temperature load test was carried out where 100 V was added at 125° C. for 1000 hours. When even one capacitor was short-circuited during the high-temperature load test, the capacitor was judged as no-good. For the capacitors, all of which maintained high voltage resistance without being short-circuited, impedance at −40° C. was evaluated and a high-temperature load test was carried out where 100 V was added at 125° C. for another 1000 hours (in total 2000 hours). When even one capacitor was short-circuited during the high-temperature load test, the capacitor was judged as no-good. For the capacitors, all of which maintained high voltage resistance without being short-circuited, impedance at −40° C. was evaluated and a high-temperature load test was carried out where 100 V was added at 125° C. for another 500 hours (in total 2500 hours). When even one capacitor was short-circuited during the high-temperature load test, the capacitor was judged as no-good. For the capacitors, all of which maintained high voltage resistance without being short-circuited, impedance at −40° C. was evaluated.

The result is summarized in Table 2. For a 100 WV class capacitor to be used, it needs to show a high voltage resistance without being short-circuited and maintain a low impedance at a low temperature at least while 100 V is experienced at 125° C. for 1000 hours, and it is preferable that the capacitor shows a high voltage resistance without being short-circuited and maintains a low impedance at a low temperature even after 100 V is experienced at 125° C. for 2000 hours or more, and especially preferable after 2500 hours or more. Also generally, as it takes a shorter time for a capacitor used at a high temperature to exhibit a decrease in voltage resistance, lower impedance tends to be required at a low temperature of −40° C. Therefore, when a capacitor was short-circuited before it experienced 100 V at 125° C. for 1000 hours, the good/no-good evaluation was not performed, because the capacitor was not able to be used as a 100 WV class capacitor. Moreover, a capacitor that was short-circuited after it experienced 100 V at 125° C. for 1000 hours before it experienced 100 V at 125° C. for 2000 hours was judged as good when the impedance at −40° C. was 1.8Ω or less. If the impedance at −40° C. exceeds 2.0Ω after 2000 hours even though short-circuiting did not occur after the capacitor experienced 100 V at 125° C. for 2000 hours, the durability of 2000 hours could not be obtained; therefore, for the impedance at −40° C. at an initial stage and after 1000 hours, 1.8Ω or less was judged as good. If short-circuiting did not occur after the capacitor experienced 100 V at 125° C. for 2000 hours and at the same time the impedance at −40° C. is 2.0Ω or less after 2000 hours, the capacitor is judged as having the durability of 2000 hours; therefore, in all evaluations (an initial stage, after 1000 hours, after 2000 hours, and after 2,500 hours), a capacitor whose impedance at −40° C. was 2.0Ω or less was judged as good.

A remarkable increase of impedance was found in the capacitor using the electrolytic solution in Comparative Example 11 containing ethylene glycol after a high-temperature load test. Also, it was found that the capacitor using the electrolytic solution of Comparative Example 9 where the total amount of boric acid and mannitol was less than 10.0% by mass, and the capacitor using the electrolytic solution of Comparative Example 4 where the water amount is more than 2.0% by mass, did not have sufficient voltage resistance and could not be used as a 100 WV class capacitor because the capacitors short-circuited in a high-temperature load test at 125° C. for 1000 hours.

The capacitor using the electrolytic solution of Comparative Example 10 where the total amount of boric acid and mannitol was more than 14.5% by mass and the capacitor using the electrolytic solution of Comparative Example 2 where the water content was more than 2.0% by mass were not short-circuited even though they experienced 100 V at 125° C. for 2000 hours. The impedances of these capacitors at −40° C. were more than 1.8Ω and less than 2.0Ω at the evaluations in the initial stage and after they experienced 100 V at 125° C. for 1000 hours, but at the evaluation after they experienced 100 V at 125° C. for 2000 hours, the impedances became more than 2.0Ω. As the impedance at −40° C. after 2000 hours exceeded 2.0Ω and durability of 2000 hours would not be obtained, an evaluation was made where the impedances in the initial stage and after they experienced 100 V at 125° C. for 1000 hours were deemed good if they were 1.8Ω or less; then, as shown in Table 2, the impedance of these capacitors at −40° C. were already defective in the initial stage.

The capacitors using the electrolytic solutions of Examples 10 and 11 and Comparative Example 3, where the total amount of boric acid and mannitol was 10.0% by mass and the water content was 2.0% or less by mass, were not short-circuited after they experienced 100 V at 125° C. for

TABLE 2

| | initial | | | during | after | during | after | during | after |
|---|---|---|---|---|---|---|---|---|---|
| | impedance | 125 V short-circuit ratio | 150 V short-circuit ratio | 1000 hour test short-circuit | 1000 hour test impedance | 2000 hour test short-circuit | 2000 hour test impedance | 2500 hour test short-circuit | 2500 hour test impedance |
| Example 1 | good | good | good | good | good | good | good | good | good |
| Example 2 | good | good | good | good | good | good | good | good | good |
| Example 3 | good | good | good | good | good | good | good | good | good |
| Example 4 | good | good | good | good | good | good | good | good | good |
| Example 5 | good | good | good | good | good | good | good | good | good |
| Example 6 | good | good | good | good | good | good | good | good | good |
| Example 7 | good | good | good | good | good | good | good | good | good |
| Example 8 | good | good | good | good | good | good | good | good | good |
| Example 9 | good | good | no-good | good | good | good | good | no-good | unmeasured |
| Example 10 | good (≤1.8 Ω) | good | no-good | good | good (≤1.8 Ω) | no-good | unmeasured | — | — |
| Example 11 | good (≤1.8 Ω) | good | no-good | good | good (≤1.8 Ω) | no-good | unmeasured | — | — |
| Comparative Example 2 | no-good (>1.8 Ω) | good | no-good | good | no-good (>1.8 Ω) | good | no-good | — | — |
| Comparative Example 3 | no-good (>1.8 Ω) | good | no-good | good | no-good (>1.8 Ω) | no-good | unmeasured | — | — |
| Comparative Example 4 | — | good | no-good | no-good | unmeasured | — | — | — | — |
| Comparative Example 9 | — | good | no-good | no-good | unmeasured | — | — | — | — |
| Comparative Example 10 | no-good (>1.8 Ω) | good | no-good | good | no-good (>1.8 Ω) | good | no-good | — | — |
| Comparative Example 11 | good | good | good | good | no-good | good | no-good | good | no-good |

1000 hours, but they were short-circuited between 1000 to 2000 hours. Therefore, it is concluded that these capacitors can be used as 100 WV class capacitors if the impedance of 1.8Ω or less at −40° C. is maintained. However, the impedance of the capacitor using the electrolytic solution of Comparative Example 3 was more than 1.8Ω. The capacitors using the electrolytic solutions of Examples 10 and 11 maintained the impedance of 1.8Ω or less at −40° C., so it was concluded that they can be used as 100 WV class capacitors. Therefore, it was found that the electrolytic solution needed to contain water of 1.5% by mass even if the total amount of boric acid and mannitol was as low as 10.0% by mass.

Conversely, the capacitors using the electrolytic solutions of Examples 1 to 8 had a low impedance of 2Ω or less at −40° C., and the short-circuit ratio was low when 150 V was added, and after a load test of 100 V at 125° C. for 2500 hours, both impedance and voltage resistance showed no problems, and the capacitors were found to be excellent as 100 WV class capacitors. These results showed that the total amount of boric acid and mannitol was preferably 12.5 to 14.5% by mass of the total electrolytic solution.

Table 3 shows the values of capacitance and impedance at an initial stage (before the high-temperature load test) and the values of capacitance change ratio and impedance after a high-temperature load test of 100 V at 125° C. for 2500 hours, of the capacitor using the electrolytic solution of Example 8. Also, the values of capacitance change ratio and impedance after a high-temperature non-load test instead of the aforementioned high-temperature load test, where the capacitors were left at 125° C. for 2500 hours without adding voltage, were also shown.

TABLE 3

|  | initial | | after a high-temperature test | |
| --- | --- | --- | --- | --- |
|  | capacitance (μF) | impedance (Ω) | Δ capacitance (%) | impedance (Ω) |
| load test | 101 | 0.2 | −1.0 | 0.25 |
| non load test | 100 | 0.2 | −2.0 | 0.25 |

The capacitor using the electrolytic solution of Example 8 showed a stable capacitance and impedance after the high-temperature load test of 100 V at 125° C., for 2500 hours and the high-temperature non-load test at 125° C. for 2500 hours.

INDUSTRIAL APPLICABILITY

The electrolytic solution for an electrolytic capacitor of the present invention gives a capacitor that guarantees a 100 WV class function when used in a high-temperature, shows a low specific resistance at a low temperature, and moreover, provide an electrolytic capacitor having little deterioration of capacitance and impedance characteristics after long-time use at a high temperature. Therefore, the capacitor using the electrolytic solution of the present invention is extremely suitable for an electrolytic capacitor for a control circuit of a fuel injection device of a vehicle engine, etc.

What is claimed is:

1. An electrolytic solution for an electrolytic capacitor comprising:
   a mixed organic solvent having sulfolane and γ-butyrolactone;
   water;
   an electrolyte selected from a group consisting of a quaternary imidazolinium salt of carboxylic acid and a quaternary pyrimidinium salt of carboxylic acid;
   boric acid; and
   mannitol, wherein the mass ratio of boric acid and mannitol is in a range of 1:1.2 to 1:1.6, and the total amount of boric acid and mannitol is 10.0 to 14.5% by mass of the total electrolytic solution, and the water content is 1.5 to 2.0% by mass of the total electrolytic solution.

2. The electrolytic solution for an electrolytic capacitor according to claim 1, wherein the total amount of boric acid and mannitol is 12.5 to 14.5% by mass of the total electrolytic solution.

3. An electrolytic capacitor comprising:
   a positive electrode made of valve metal foil with an oxide film on the surface;
   a negative electrode made of valve metal foil; and
   a separator holding an electrolytic solution between the positive electrode and the negative electrode; the electrolytic solution being the electrolytic solution for an electrolytic capacitor according to claim 1.

4. An electrolytic capacitor comprising:
   a positive electrode made of valve metal foil with an oxide film on the surface;
   a negative electrode made of valve metal foil; and
   a separator holding an electrolytic solution between the positive electrode and the negative electrode; the electrolytic solution being the electrolytic solution for an electrolytic capacitor according to claim 2.

* * * * *